(12) United States Patent
Yoshiga et al.

(10) Patent No.: US 11,733,568 B2
(45) Date of Patent: Aug. 22, 2023

(54) TRANSPARENT DISPLAY

(71) Applicant: InnoLux Corporation, Miao-Li County (TW)

(72) Inventors: Masahiro Yoshiga, Miao-Li County (TW); Satoru Takahashi, Miao-Li County (TW); Toshiya Inada, Miao-Li County (TW)

(73) Assignee: InnoLux Corporation, Miao-Li County (TW)

( * ) Notice: Subject to any disclaimer, the term of this patent is extended or adjusted under 35 U.S.C. 154(b) by 0 days.

(21) Appl. No.: 17/679,045

(22) Filed: Feb. 23, 2022

(65) Prior Publication Data

US 2022/0187662 A1 Jun. 16, 2022

Related U.S. Application Data

(62) Division of application No. 16/952,054, filed on Nov. 18, 2020, now Pat. No. 11,300,838.

(51) Int. Cl.
*G02F 1/1343* (2006.01)
*G02F 1/1335* (2006.01)
*G02F 1/1347* (2006.01)
*G02F 1/1333* (2006.01)

(52) U.S. Cl.
CPC .... *G02F 1/134309* (2013.01); *G02F 1/13439* (2013.01); *G02F 1/13471* (2013.01); *G02F 1/133553* (2013.01); *G02F 1/133342* (2021.01); *G02F 2203/01* (2013.01)

(58) Field of Classification Search
None
See application file for complete search history.

(56) References Cited

U.S. PATENT DOCUMENTS

| | | | |
|---|---|---|---|
| 2001/0020990 A1* | 9/2001 | Moon | G02F 1/13363 349/96 |
| 2005/0105021 A1* | 5/2005 | Lee | G02F 1/133553 349/113 |
| 2007/0121035 A1* | 5/2007 | Lee | G02F 1/133553 349/113 |
| 2016/0095210 A1* | 3/2016 | Heo | G02F 1/136286 29/850 |
| 2016/0313602 A1* | 10/2016 | Xie | G02F 1/133555 |
| 2018/0088414 A1* | 3/2018 | Jiang | G02F 1/133553 |
| 2020/0110214 A1* | 4/2020 | Son | G02F 1/1333 |
| 2021/0408136 A1* | 12/2021 | Jeong | H10K 59/121 |
| 2022/0187662 A1* | 6/2022 | Yoshiga | G02F 1/13439 |

FOREIGN PATENT DOCUMENTS

| | | | | |
|---|---|---|---|---|
| CN | 109656056 A | * | 4/2019 | ....... G02F 1/133512 |
| KR | 20170061868 A | * | 6/2017 | |

* cited by examiner

*Primary Examiner* — Ryan Crockett
(74) *Attorney, Agent, or Firm* — Winston Hsu

(57) ABSTRACT

A transparent display device has a first substrate, a second substrate, and a display medium disposed between the first substrate and the second substrate. A pixel unit of the transparent display includes a transparent region and a display region. In the display region, a first reflective material is disposed between the first substrate and the display medium, and a second reflective material is disposed between the second substrate and the display medium.

6 Claims, 10 Drawing Sheets

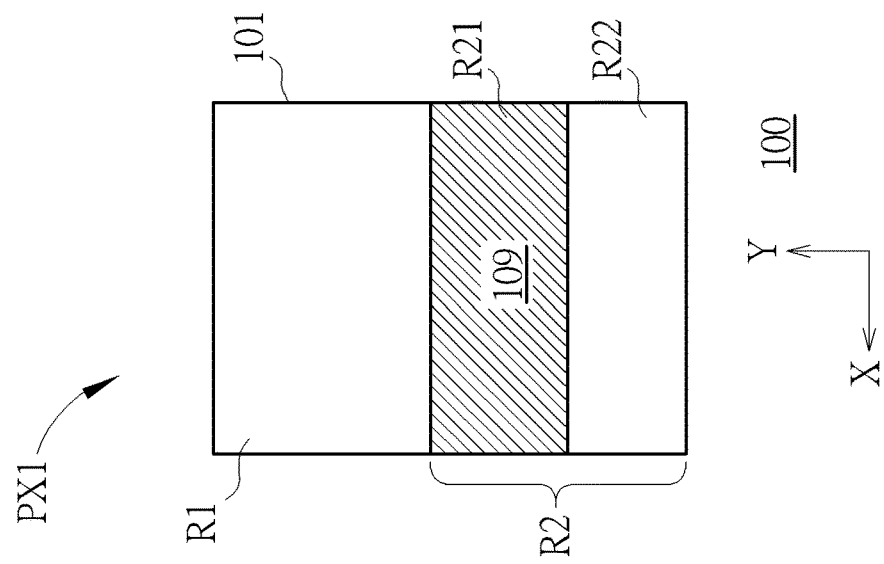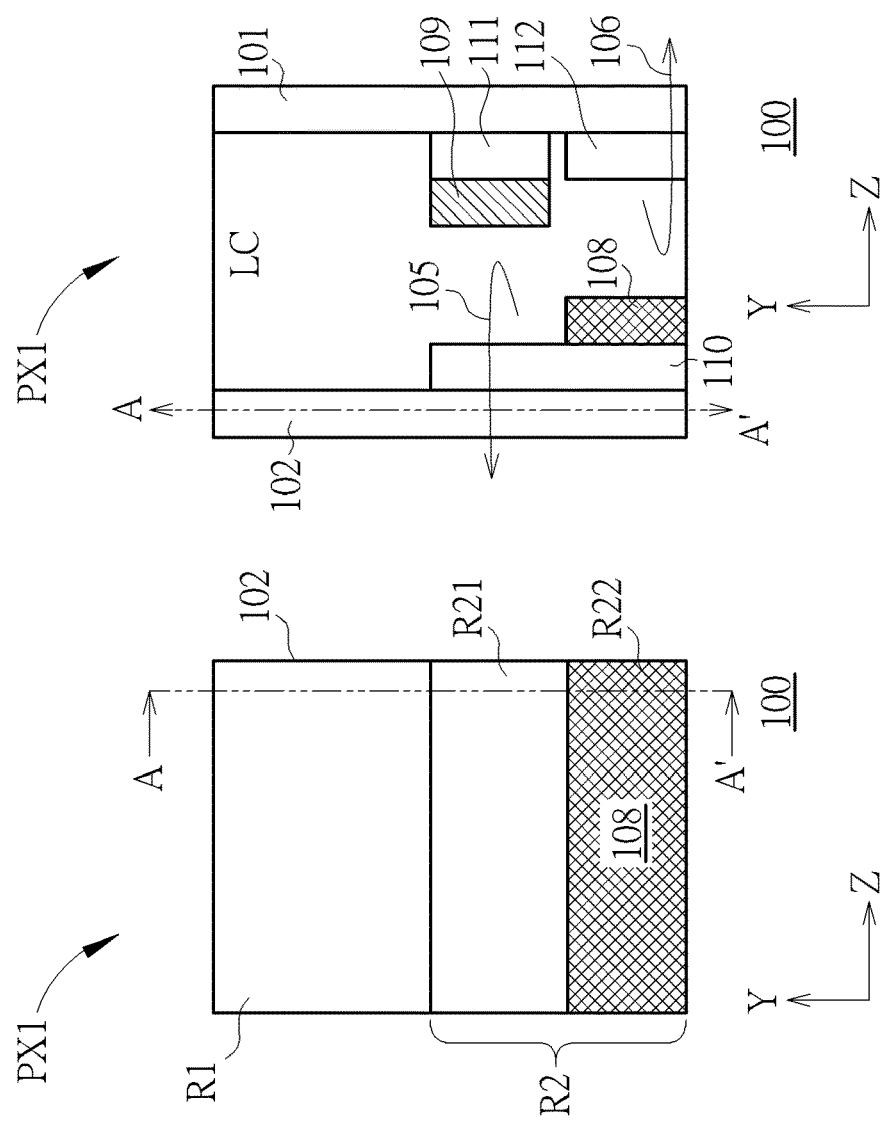

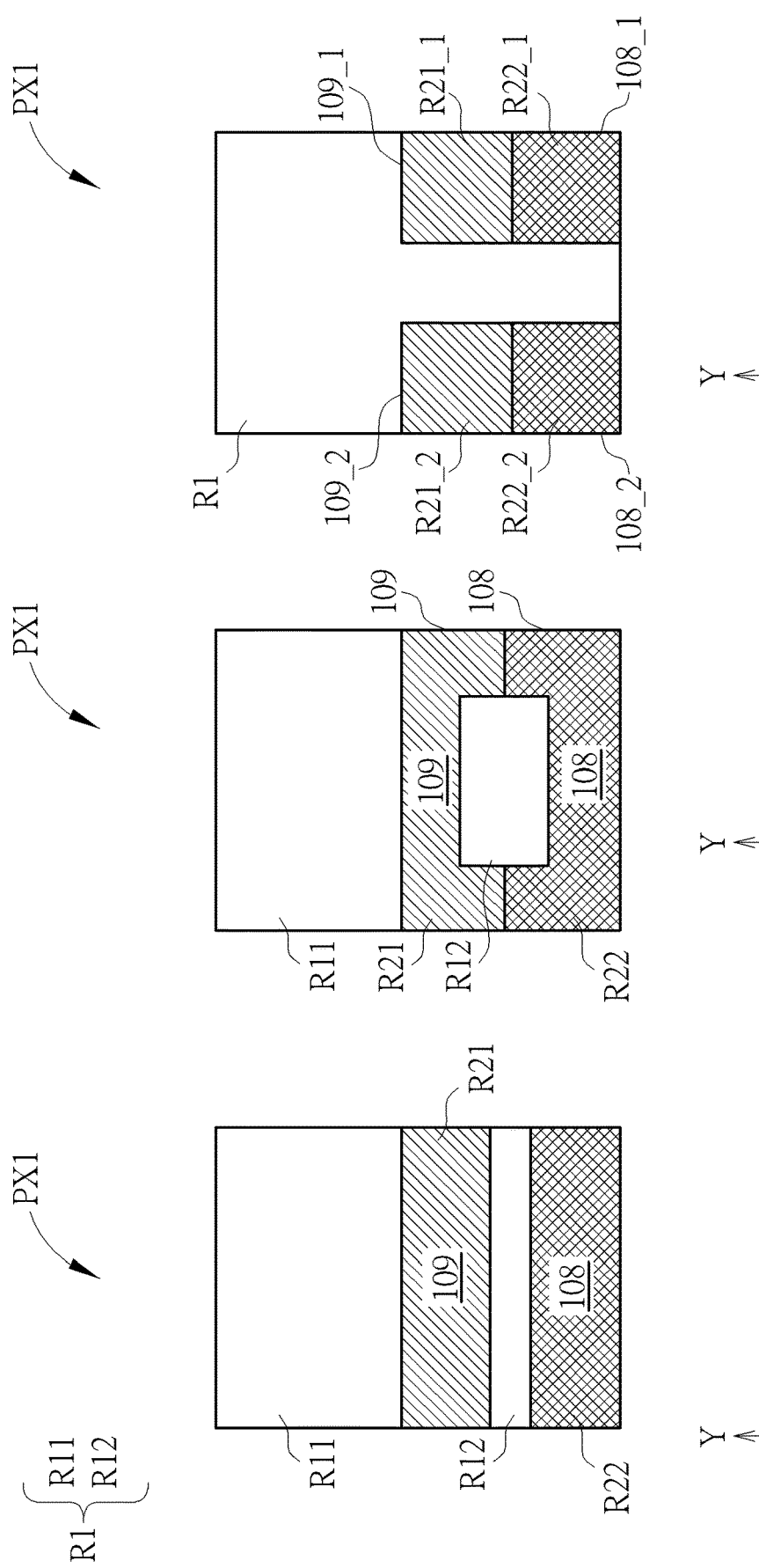

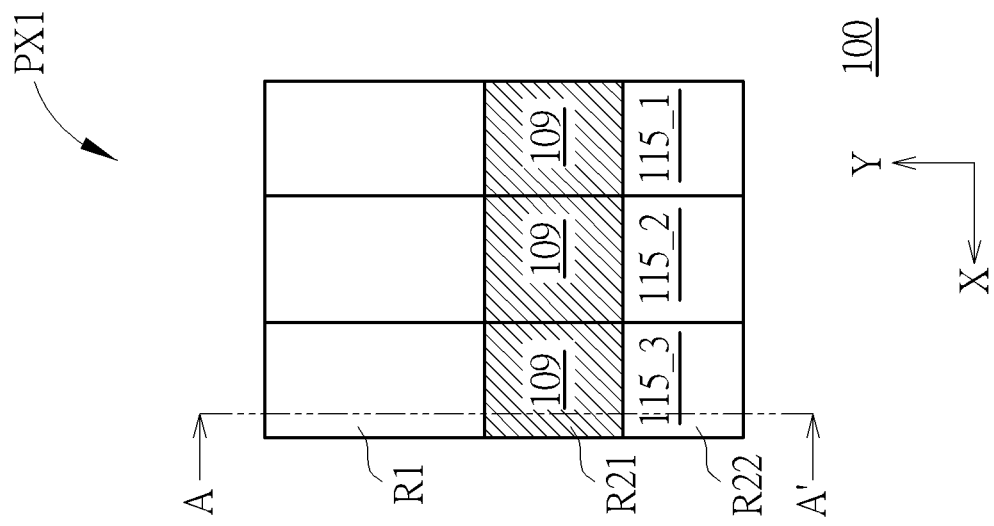
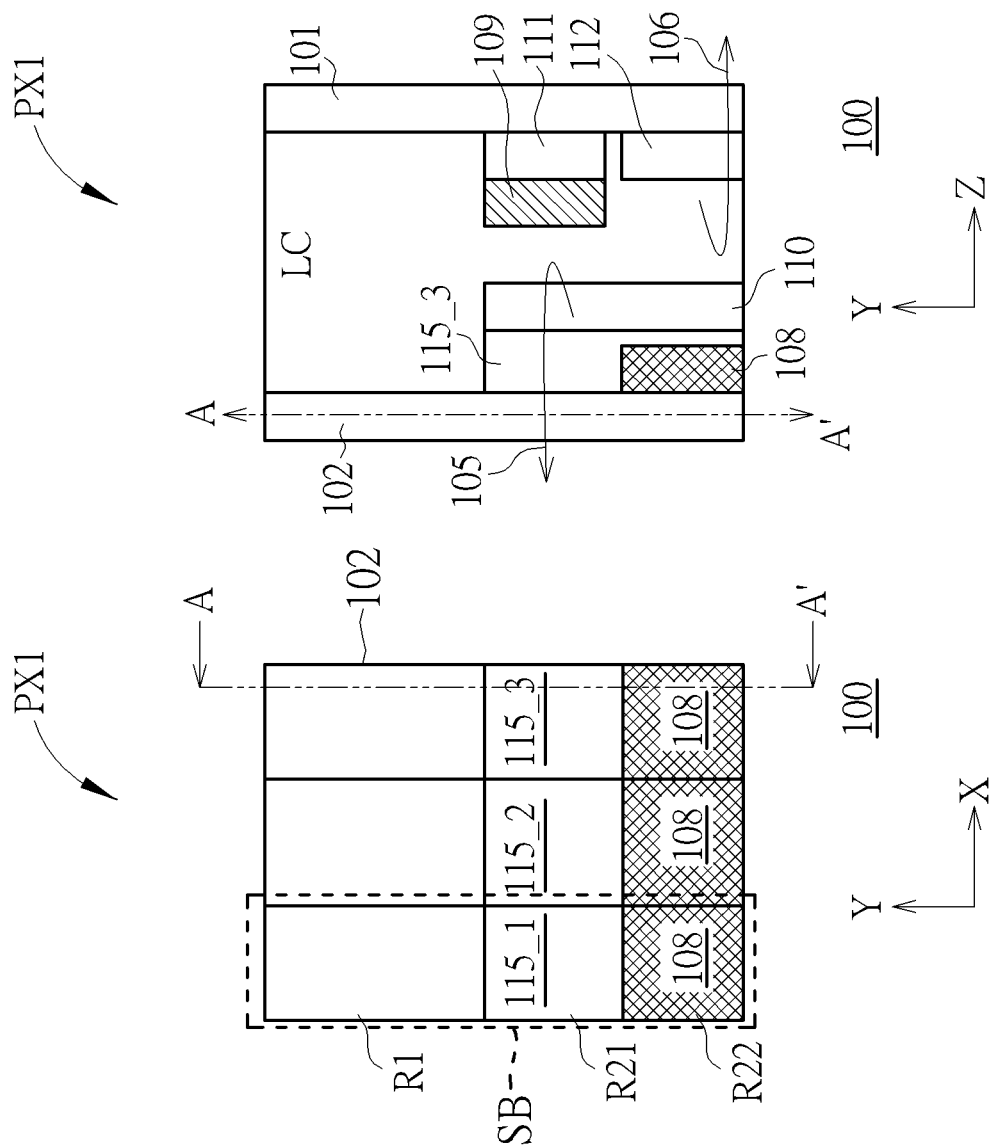
FIG. 3A  FIG. 3B  FIG. 3C

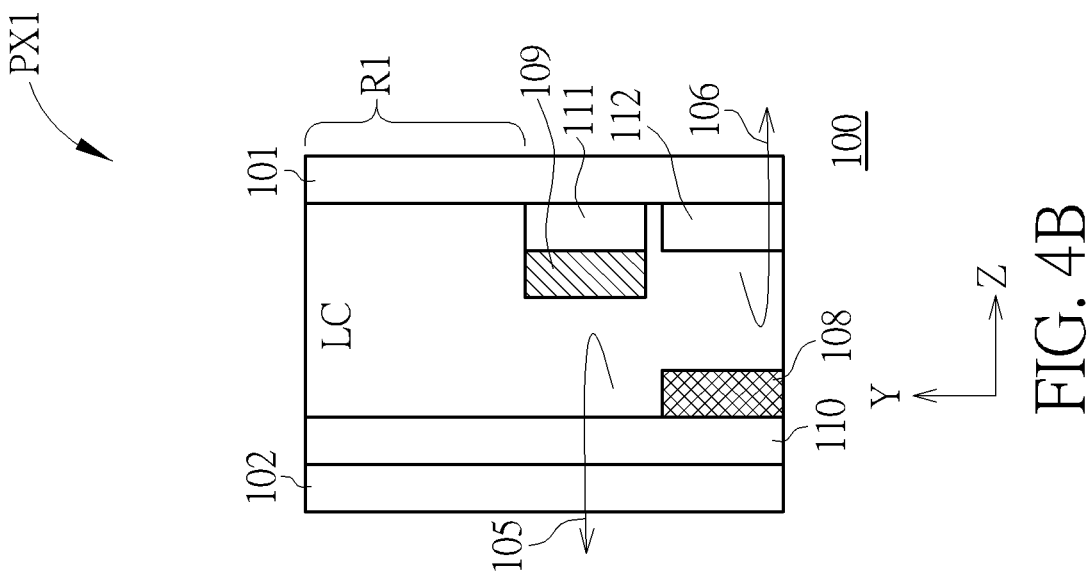
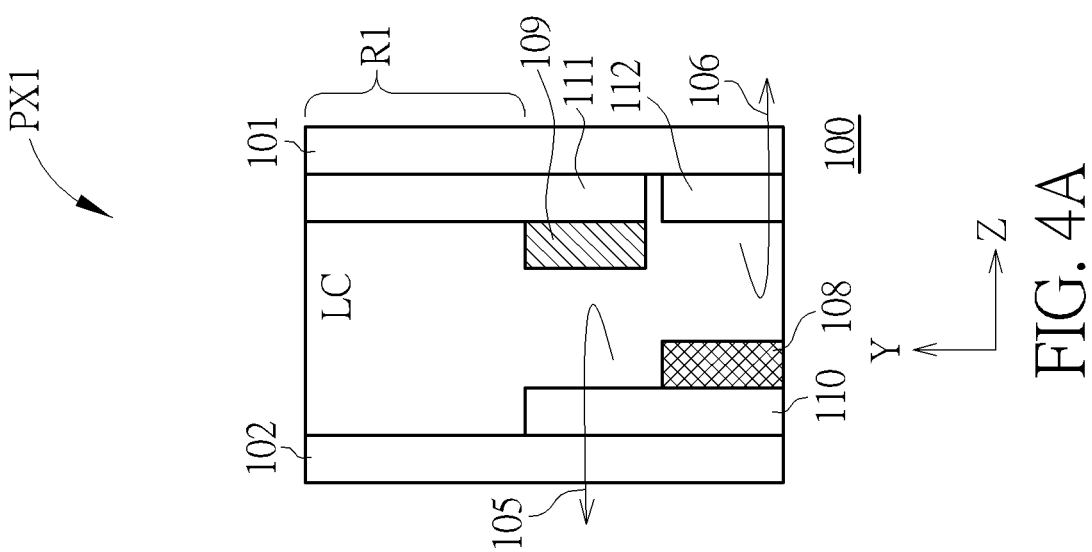

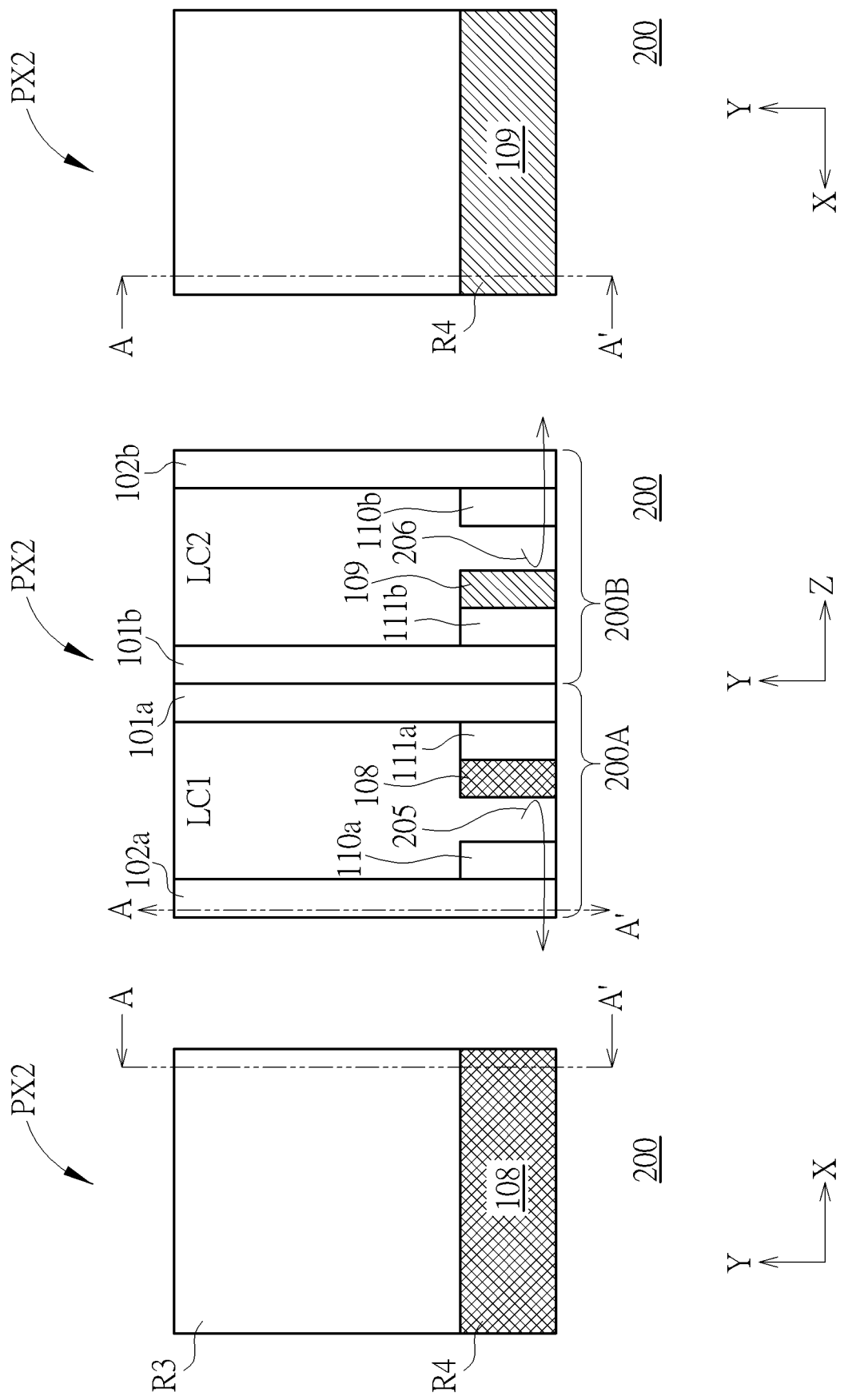

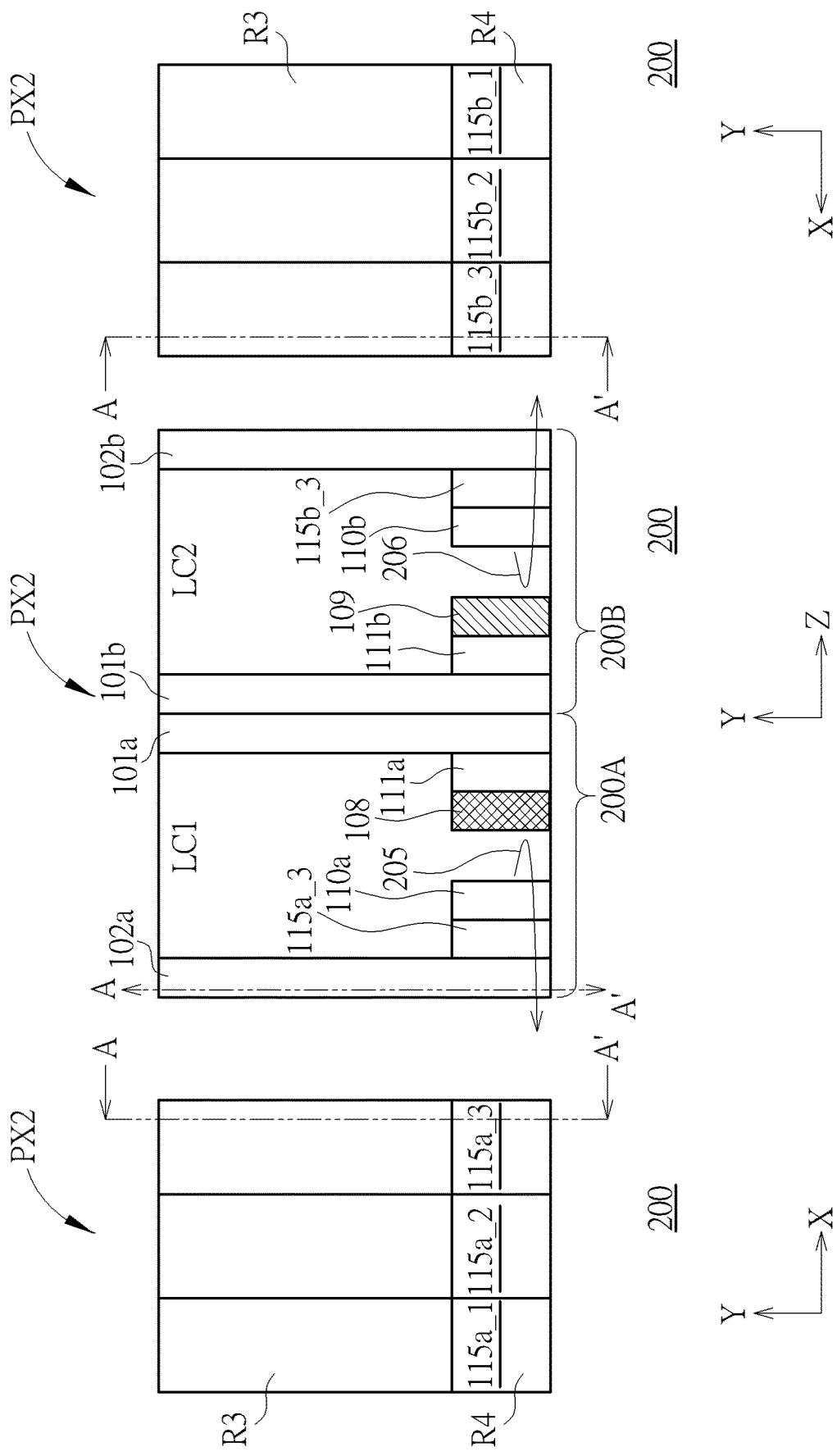

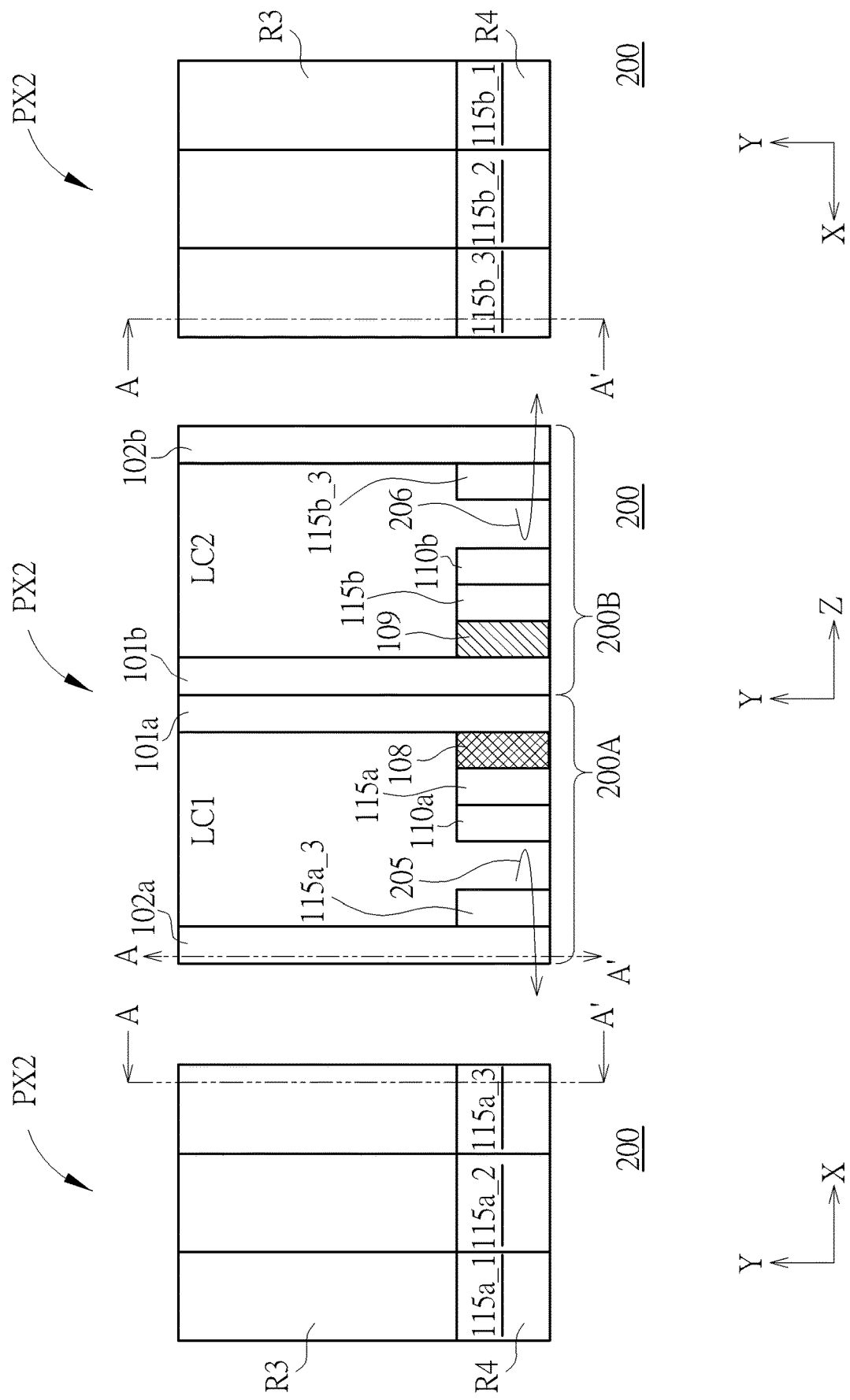

TRANSPARENT DISPLAY

CROSS REFERENCE TO RELATED APPLICATIONS

This application is a division of U.S. application Ser. No. 16/952,054, filed on Nov. 18, 2020. The content of the application is incorporated herein by reference.

BACKGROUND OF THE DISCLOSURE

1. Field of the Disclosure

This application relates to a transparent display, and more specifically to a transparent display that provides readable information for both front and rear side views.

2. Description of the Prior Art

The transparent displays show a visible image for both front side and rear side views. However, when characters are displayed as readable from the front side view, they are reversed and not easily readable from the rear side view.

SUMMARY OF THE DISCLOSURE

The present disclosure provides a transparent display device comprising a plurality of pixel units. One of the plurality of pixel units (PX1) has a transparent region and a display region. The pixel unit comprises a first substrate, a second substrate, and a display medium disposed between the first substrate and the second substrate. A first reflective material is disposed in the display region and is disposed between the first substrate and the display medium. A second reflective material is disposed in the display region and is disposed between the second substrate and the display medium.

Another transparent display device having a first transparent display panel and a second transparent display panel is also disclosed, that further includes a pixel unit that comprises a transparent region and a display region. The first transparent display panel comprises a first reflective material, the second transparent display panel comprises a second reflective material disposed corresponding to the first reflective material, and the first reflective material and the second reflective material are disposed in the display region.

These and other objectives of the present disclosure will no doubt become obvious to those of ordinary skill in the art after reading the following detailed description of the embodiment that is illustrated in the various figures and drawings.

BRIEF DESCRIPTION OF THE DRAWINGS

FIGS. 1A-1C illustrate three views of an embodiment of a transparent display.

FIGS. 2A-2C illustrate a few variations of the embodiment of FIG. 1A.

FIGS. 3A-3C illustrate a variation of the embodiment of FIG. 1A-1C that includes a color filter.

FIGS. 4A-4B illustrate further variations of the embodiment of FIG. 1A-1C.

FIGS. 6A-6C illustrate another embodiment of a transparent display.

FIGS. 7A-7C illustrate a variation of the embodiment of FIG. 6A-6C that includes a color filter.

FIGS. 8A-8C illustrate another variation of the embodiment of FIG. 7A-7C.

FIG. 11 illustrates a schematic diagram of a stack of two display panels.

FIG. 12 illustrates a schematic diagram of the reflective material and/or conductive lines.

DETAILED DESCRIPTION

Figure 5:
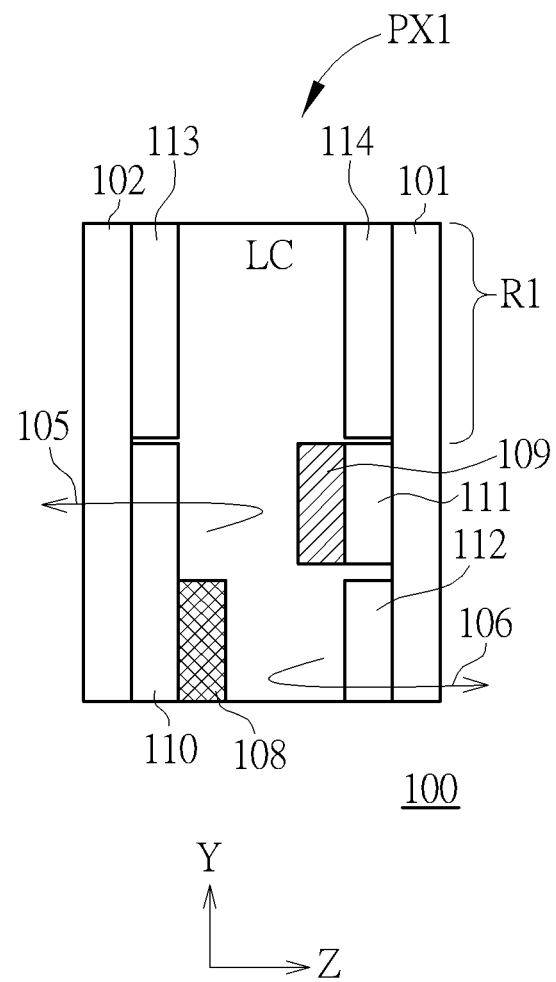
FIG. 5 illustrates an additional variation of the embodiment of FIG. 1B.

Some words are used to refer to specific components in the whole specification and the appended claims in this disclosure. A person skilled in the art should understand that a display device manufacturer might use different names to refer to the same components. This specification is not intended to distinguish components that have the same functions but different names. In this specification and the claims, words such as "include", "comprise", and "have" are open words, and should be interpreted as "including, but not limited to".

The directional terms mentioned herein, like "above", "below", "front", "back", "left", and "right", refer to the directions in the accompanying drawings Therefore, the directional terms are only used for illustration instead of limiting this disclosure. In the accompanying drawings, common features of a method, a structure and/or a material used in a specific embodiment are shown in the drawings. However, these drawings should not be construed as defining or limiting the scope or nature of these embodiments. For example, the relative sizes, thicknesses and positions of films, regions and/or structures may be reduced or enlarged for clarity.

When a corresponding component such as a film or a region is referred to as being "on another component", it may be directly on the another component, or there may be other components between the two components. In another aspect, when a component is referred to as being "directly on another component", there is no component between the two components. In addition, when a component is referred to as being "on another component", the two components have an up and down relationship in a top view. The component may be located above or below the another component, and the up and down relationship depends on the orientation of the device.

Ordinal numbers used in this specification and the claims, like "first" and "second", are used to modify the components, and do not imply or represent that the (or these) component (or components) has (or have) any ordinal number, and do not indicate any order between a component and another component, or an order in a manufacturing method. These ordinal numbers are merely used to clearly distinguish a component having a name with another component having the same name. Different terms may be used in the claims and the specification, so that a first component in the specification may be a second component in the claims.

It should be noted that, in the following embodiments, the technical features in several different embodiments may be replaced, recombined, and mixed to complete other embodiments without departing from the spirit of the disclosure.

In this application, a transparent display device may include liquid crystal, organic light emitting diode (OLED), inorganic light emitting diode, mini light emitting diode (Mini-LED), micro light-emitting diodes (Micro-LED), quantum dot light-emitting diode (QLED/QDLED), Electro-Phoretic, Fluorescence, Phosphor), other suitable materials or combinations of the above materials, but the present disclosure is not limited thereto. In some embodiments, the liquid crystal may include Polymer Network Liquid Crystal (PNLC) or Polymer Dispersed Liquid Crystal (PNLC), but the present disclosure is not limited thereto.

In addition, the appearance of the transparent display device may be rectangular, circular, polygonal, a shape with curved edges, or other suitable shapes. The transparent display device may further include a driving system, a control system, a light source system, a shelf system, etc., and peripheral systems to support the transparent display device.

In the present disclosure, the transparent display device in general comprises a permanent transparent region or a transparent region under switching control. The permanent transparent region in an embodiment may be transparent material. However, some materials may have the non-transparent state but can be switched to transparent state under control by applying a bias. In other words, the disclosure may form the transparent region according to the actual design. In some embodiments, the transparent region may include or may not include an electrode. If the electrode is included in the transparent region, it can be applied with an operation voltage to be normally white, which is at the transparent state.

The disclosure of embodiments is based on the drawings as an example. However, the disclosures in the other embodiments and drawings with the features described above may also fall into the protection scope of the disclosure. In this application, a normally transparent mode display is used to describe the disclosure, but the application is not limited to this as the teachings herein may be equally applied to a normally diffused mode display without straying from the intended scope.

Please refer to FIG. 1A-1C. FIG. 1A is an example of front side view of a first embodiment of the transparent display device 100 having a pixel unit of the transparent display device. In order to clearly describe the structure, one pixel unit PX1 is shown as FIG. 1A-1C. In other embodiments, the transparent display device 100 may include a plurality of pixel units, but the disclosure is not limited thereto. FIG. 1B is a cross-sectional view of FIG. 1A along the line A→A'. FIG. 1C is a rear side view of the transparent display device 100. FIG. 1A is the icon of FIG. 1B viewed from left to right. FIG. 1C is the icon of FIG. 1B viewed from right to left. As shown in the FIG. 1A-1C, the pixel unit PX1 has a transparent region R1 and the display region R2. The display region R2 may include a first region R21 and a second region R22. In a front view, as shown in FIG. 1A, the first region R21 is disposed between the transparent region R1 and the second region R22. In the present disclosure, for example, the display region may be used to display images. In the transparent region, for example, the screen or objects on the other side can be seen from one side of the transparent display device 100, but this is not limited thereto.

In other embodiments, for example, a pixel unit PX1 can be roughly defined as surrounded by two scan lines and two data lines. In some embodiments, the two adjacent scan lines are two scan lines with the same function, and there are no other scan lines with the same function as the above-mentioned two scan lines between the two scan lines with the same function. The data lines are two data lines with the same function and there are no other data lines with the same function as the above two data lines between the two data lines, but the disclosure is not limited to this. In this embodiment, a pixel unit may be a region surrounded by the lower edge of a scan line, the lower edge of an adjacent scan line, the left edge of a data line, and the left edge of an adjacent data line. In other embodiments, one pixel unit may also be an region surrounded by a center line extending along the X-axis direction of a scan line, a center line extending along the X-axis direction of adjacent scan L, a center line extending along the Y-axis direction of a data line, and a center line of the adjacent data line extending along the Y axis. In other embodiments, a pixel unit can also be enclosed by the upper edge of the scan line, the upper edge of the adjacent scan line, the right edge of the data line, and the right edge of the adjacent data line. However, this disclosure is not limited to this. The pixel unit may include a part of a vertically stacked layer (or element) structure, for example, at least a part of the substrate 101, a part of the substrate 102, and/or a part of the display medium.

In FIG. 1A-1C, the transparent region R1 might be transparent, while both of the first region R21 and the second region R22 are active regions. In this embodiment, please refer to FIG. 1B, the pixel unit PX includes a substrate 101, a substrate 102, and the display medium LC disposed between the substrate 101 and the substrate 102. The material of the substrate 101 and the substrate 102 may be, for example, a flexible substrate, a rigid substrate, or a combination thereof. For example, the material of the substrate 101 and the substrate 102 may include plastic, glass, quartz, sapphire, polycarbonate (PC), polyimide (PI), polyethylene terephthalate (PET), other suitable transparent substrate materials, or a combination of the foregoing, but this is not limited thereto. In the present disclosure, other elements (for example, transistor and/or conductive line, etc.) or layers may be disposed on the substrate 101 which are not shown in the FIGs, but this is not limited thereto. The above-mentioned substrate 101 and/or second substrate 102 may be the same substrate as the substrates in other pixel units.

As shown in the A-A' cross-sectional view FIG. 1B, an electrode 111 and an electrode 112 are disposed on the substrate 101, and disposed in the first region R21 and the second region R22 respectively. Furthermore, the electrode 111 and the electrode 112 are disposed between the substrate 101 and the display medium LC. The electrode 111 and electrode 112 may be pixel electrodes. In the display region R2, a reflective material 109 is disposed on the electrode 111 and disposed between the substrate 101 and the display medium LC. The reflective material 109 and the electrode 111 are at least partially overlapped in the normal direction of the surface of the substrate 101 (for example, direction Z). The electrode 111 and electrode 112 in each of the first region R21 and the second region R22 may be controlled separately. The material of the electrode 111 and the electrode 112 may include transparent conductive material, for example, indium tin oxide, indium zinc oxide, indium oxide, zinc oxide, tin oxide, organic conductive material, other suitable materials, or a combination of the above, but the disclosure is not limited thereto.

A direction X, a direction Y and a direction Z is labeled in FIG. 1A-1C. The direction Z is perpendicular to the upper surface or the lower surface of the substrate 101 or the substrate 102, the direction X and the direction Y may be parallel to the upper surface or the lower surface of the substrate 101 or the substrate 102. The direction Z may be perpendicular to the direction X and the direction Y, and the direction X may be perpendicular to the direction Y. In the following figures, the spatial relationship in the structure may be described according to the direction X, the direction Y and the direction Z.

Please continue to refer to FIG. 1B, an electrode 110 is disposed on the substrate 102, and disposed in the first region R21 and the second region R22. In the second region R22 of the display region R2, a reflective material 108 is disposed on the electrode 110 and disposed between the substrate 102 and the display medium LC. Additionally, the reflective material 108 disposed in the second region R22 which may not be overlapped with the reflective material 109 in the Z direction. Due to the reflective material 108 and the reflective material 109, content and/or the image in the first region is visible from the front side view as indicated by the arrow 105, and content and/or the image in the second region R22 is visible from the rear side view, indicated by the arrow 106, and seen as correctly displayed from the front side view and the rear side view. The reflective material 108 and the reflective material 109 may be a higher reflectance material and include Ag, Ag alloy, Al, and/or Al alloy and so on, but not limited to this. In this embodiment, FIGS. 1A and 1C only show the position of reflective material 108 and the reflective material 109 and omit other components.

FIGS. 2A-2C illustrate a few variations of the first embodiment showing example divisions of at least one of pixel unit PX1 of the transparent display device 100 when desired. FIG. 2A-2C are example front and/or rear display sides of the first embodiment of the transparent display device. In detail, FIG. 2A-2C show the position of reflective material 108 and the reflective material 109 in one pixel unit PX1.

In the FIG. 2A and FIG. 2B, the transparent area R1 may be divided into 2 or more individual areas, for example, sub transparent region R11 and the sub transparent region R12, such as having the sub transparent region R12 separating the first region R21 and the second region R22, or perhaps placed in the midst of the first region R21 and the second region R22. In some embodiments, at least one of the first region R21 and the second region R22 is divided into two or more sub region, perhaps with an extending portion of the transparent area R1 separating the at least one of the first region R21 and the second region R22 as shown in FIG. 2C. Many other arrangements are possible according to design considerations. In detail, as shown in FIG. 2C, the reflective material 108_1 and the reflective material 108_2 are disposed on the substrate 102 and respectively disposed in the second sub region R22_1 and the second sub region R22_2. The reflective material 109_1 and the reflective material 109_2 are disposed on the substrate 101 and respectively disposed in the first sub region R21_1 and the first sub region R21_2, but not limited to this.

FIGS. 3A-3C illustrate a variation of the embodiment that includes a color filter 115_1~115_3. FIG. 3A is an example front side view of the embodiment of the pixel unit PX1 of the transparent display device 100. In this embodiment, the pixel unit PX1 may include three sub pixels SB (one sub pixel SB as shown by dotted line). The structure of one sub pixel SB may be the same as the pixel unit PX1 as shown in FIG. 1A. FIG. 3B is a cross-sectional view of FIG. 3A along the line A→A'. FIG. 3C is a rear side view of the pixel unit PX1 of the transparent display device 100. FIG. 3A is the icon of FIG. 3B viewed from left to right. FIG. 3C is the icon of FIG. 3B viewed from right to left.

The embodiment of FIG. 3A-3C may include a color filter 115_1~115_3, such as a Red-Green-Blue color filter, disposed on the substrate 102 and disposed in both the first region R21 and the second region R22. In addition, the color filter may be disposed between the substrate 102 and the electrode 110 (or the display medium LC). In detail, in this embodiment, the reflective material 108 is disposed on the substrate 102, the electrode 110 is disposed on the reflective material 108, and the color filter 115_1~115_3 is disposed between the reflective material 108 and the display medium LC, but is not limited to this structure. In this manner, due to the arrangement of the reflective material 108, the reflective material 109 and the color filter, color content and/or the image seen as correctly displayed from the front side view and the rear side view. In some embodiments, the color filters 115_1~115_3 may include other colors, and/or the color filters 115_1~115_3 may have same color, but not limited to this.

In some embodiments, the electrode 110 may be divided into three sections respectively belong to each of the sub pixels SB. In another embodiment, the electrode 110 may be a common electrode overlapped with the first region R21 and second region R22 of the one or more than one sub pixels SB, and may optionally extend into other region of the transparent display device 100, but not limited to this.

FIGS. 4A and 4B illustrate cross-sectional views of variations of the embodiment shown as the FIG. 1B. Please refer to the FIG. 4A, the electrode 110 and/or the electrode 111 may extend from one or both of the first region R21 and the second region R22 into the transparent area R1 according to design considerations. In detail, FIG. 4A shows that the electrode 111 extends into the transparent region R1, and FIG. 4B shows that the electrode 110 extends into the transparent area R1, but not limited to this. Therefore, the electrode 111 is disposed in the first region R21 and the transparent region R1.

In additional variations of the first embodiment of the FIG. 1B are shown in FIG. 5, which is a cross-sectional view of the transparent display device 100. The pixel unit PX1 of the transparent display device 100 further comprises an electrode 113 and an electrode 114 that may be disposed in the transparent region R1. The electrode 113 and electrode 114 may be respectively disposed on the substrate 101 and the substrate 102. The material of the electrode here may be the same or similar to the material of the aforementioned electrode and will not be repeated again. In this embodiment, the electrode 113, which is divided from the electrode 110, is disposed on the substrate 102 and disposed in the transparent region R1. The electrode 114, which is divided from the electrode 111, is disposed on the substrate 101 and disposed in the transparent region R1. Furthermore the electrode 113 is disposed between the substrate 102 and the display medium LC, and the electrode 114 is disposed between the substrate 101 and the display medium LC.

In some embodiments, when the transparent region R1 is normally transparent, 0V or the same voltage can be applied to both of the electrode 113 and the electrode 114 in normally transparent mode. Any other voltage may be applied to both of the electrode 113 and the electrode 114 to make the transparent region R1 change to the diffuse state. When the transparent region R1 is normally diffuse mode, 0V or the same voltage can be applied to both of the electrode 113 and the electrode 114 to make the transparent region R1 in diffuse state. Any other voltage may be applied to both of the electrode 113 and the electrode 114 in the transparent region R1 to make the transparent region R1 change to the normally transparent state.

FIGS. 6A-6C illustrate another embodiment of a transparent display device 200. FIG. 6A is a front side view of the embodiment of the transparent display device 200. FIG. 6B is a cross-sectional view of FIG. 6A along the line A→A'.

FIG. 6C is a rear side view of the transparent display device 200. FIG. 6A is the icon of FIG. 6B viewed from left to right. FIG. 6C is the icon of FIG. 6B viewed from right to left. In this embodiment, viewing directions are indicated by the arrows 205 and 206.

Please refer to the FIG. 6B, in this embodiment, the transparent display device 200 may include a first transparent display panel 200A and a second transparent display panel 200B overlapped with the first transparent display panel 200A. The transparent display device 200 includes a pixel unit PX2 that comprises a transparent region R3 and a display region R4. In detail, the pixel unit PX2 includes the first transparent display panel 200A and the second transparent display panel 200B which may be laminated together as shown in FIGS. 6A-6C. In the present disclosure, the transparent display device 200 may include a plurality of pixel units PX2, but not limited to this. In other word, the pixel unit PX2 may comprise a part of the first transparent display panel 200A and a part of the second transparent display panel 200B, but not limited to this.

The first transparent display panel 200A comprises a first substrate 102a, a second substrate 101a, and a first reflective material 108. The second transparent display panel 200B comprises a third substrate 101b, a fourth substrate 102b, and a second reflective material 109 disposed corresponding to the first reflective material 108, and the first reflective material 108 and the second reflective material 109 are disposed in the display region R4. The second substrate 101a and the third substrate 101b are adjacently disposed, and the second substrate 101a and the third substrate 101b are arranged between the first reflective material 108 and the second reflective material 109. The material of the first reflective material 108 and the second reflective material 109 may comprise Ag, Ag alloy, Al, and/or Al alloy, but not limited to this.

The first transparent display panel 200A may include a first display medium LC1 disposed between the first substrate 102a and the second substrate 101a, wherein the first reflective material 108 is disposed between the first display medium LC1 and the second substrate 101a. The second transparent display panel 200B may include a second display medium LC2 disposed between the third substrate 101b and the fourth substrate 102b, and the second reflective material 109 is disposed between the second display medium LC2 and the third substrate 101b.

As shown in the A-A' cross-sectional view FIG. 6B, an electrode 110a is disposed on the substrate 102a, an electrode 111a is disposed on the substrate 101a, an electrode 111b is disposed on the substrate 101b, and an electrode 110b is disposed on the substrate 102b. The material of the electrode here may be the same or similar to the material of the aforementioned electrode and will not be repeated again.

FIGS. 7A-7C illustrate a variation of the embodiment of the FIGS. 6A-6C in that the transparent display device 200 further includes a color filter CF 115a_1~115a_3, and a color filter 115b_1~115b_3 (similar to the color filter 115_1~115_3 in the first embodiment) in the display region R4 of each of first transparent display panel 200A and second transparent display panel 200B.

FIG. 7A is an example front side view of an embodiment of the transparent display device 200. FIG. 7B is a cross-sectional view of FIG. 7A along the line A→A'. FIG. 7C is a rear side view of the transparent display device 200. FIG. 7A is the icon of FIG. 7B viewed from left to right. FIG. 7C is the icon of FIG. 7B viewed from right to left. The example may include a transparent region R3 and a display region R4.

In the first transparent display panel 200A, the color filter 115a_3 may be disposed between the substrate 102a and the electrode 110a on the substrate 102a. The first reflective material 108 may be disposed on the electrode 111a on the substrate 101a. In the second transparent display panel 200B, the color filter 115b_3 may be disposed between the substrate 102b and the electrode 110b on the substrate 102b. The second reflective material 109 may be disposed on the electrode 111b on the substrate 101b.

FIGS. 8A-8C illustrate another variation of the embodiment of the FIGS. 7A-7C. The transparent display device 200 of the present embodiment is similar to that shown in FIGS. 7A-7C, except for the following differences. In the present embodiment, the reflective material 108 is disposed between the substrate 101a and the electrode 111a. Further, the at least one of color filters 115a_1~115a_3 is disposed on the reflective material 108 and disposed between the reflective material 108 and the electrode 111a. The reflective material 109 is disposed between the substrate 101b and the electrode 111b. Further, the at least one of color filters 115b_1~115b_3 is disposed on the reflective material 109 and disposed between the reflective material 109 and the electrode 111b. However, the present disclosure is not limited thereto.

Figure 9A:
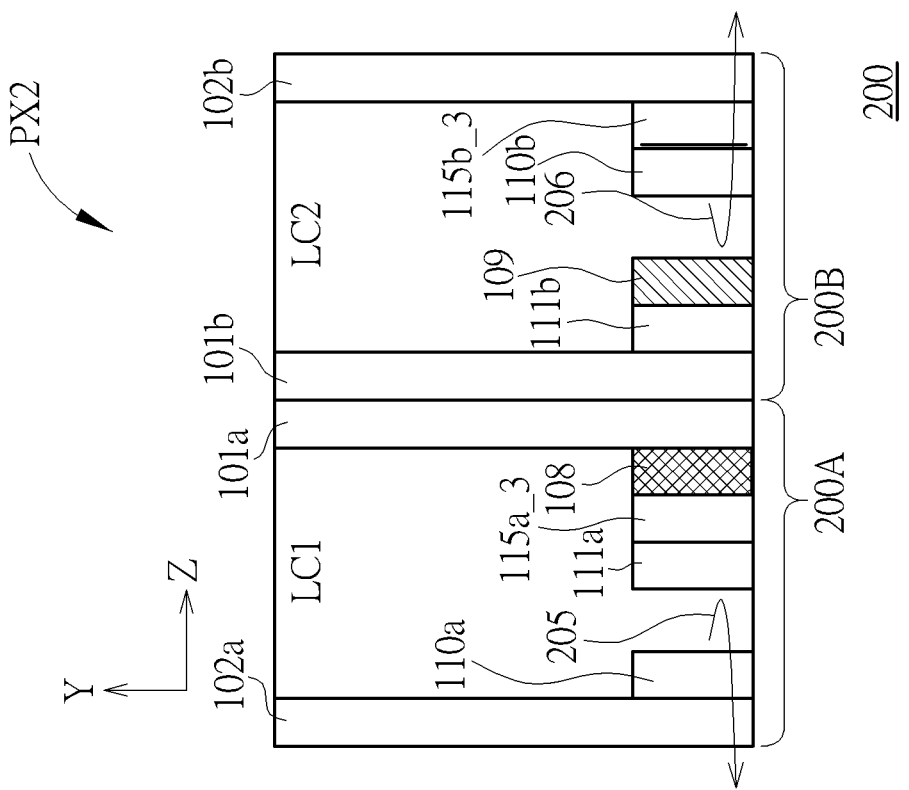
FIGS. 9A-9B illustrate further variations of the embodiment of FIG. 7A-7C.
Figure 9B:
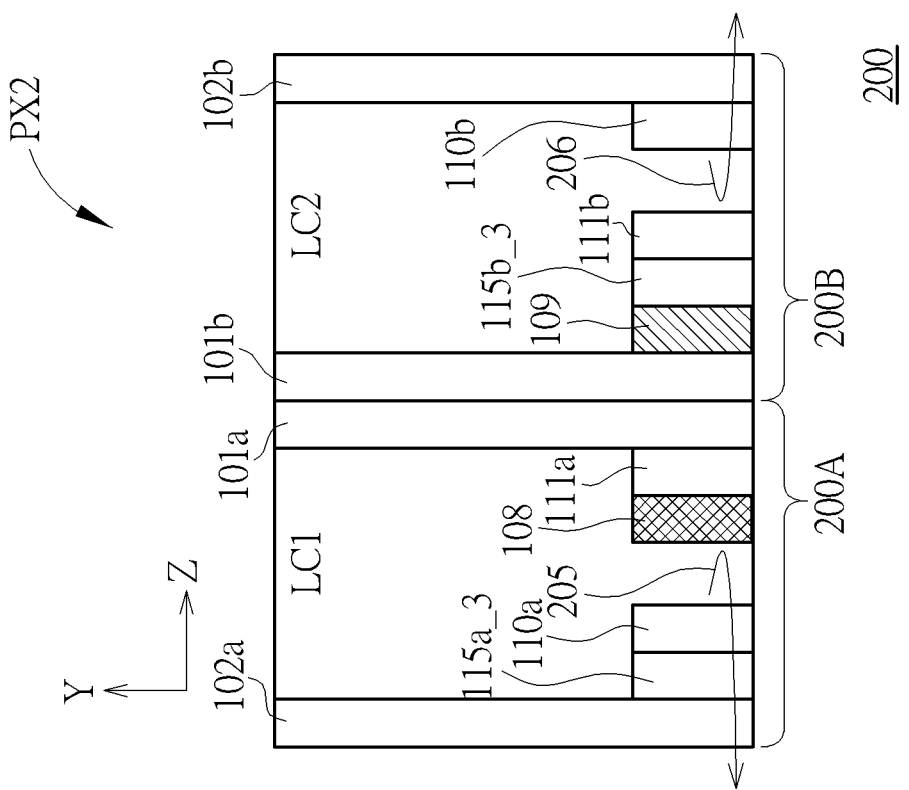

FIGS. 9A-9B illustrate further variations of the embodiment of the FIG. 7B. Please refer to the FIG. 9A, the transparent display device 200 of the present embodiment is similar to that shown in FIG. 7B, except for the following differences. In the present embodiment, the reflective material 109 is disposed between the substrate 101b and the electrode 111b. Further, at least one of the color filters 115b_1~115b_3 is disposed on substrate 101b and disposed between the reflective material 109 and the electrode 111b. However, the present disclosure is not limited thereto.

Please refer to the FIG. 9B, the transparent display device 200 of the present embodiment is similar to that shown in FIG. 7B, except for the following differences. In the present embodiment, the at least one of color filters 115a_1~115a_3 is disposed on the reflective material 108 and disposed between the reflective material 108 and the electrode 111a. However, the present disclosure is not limited thereto. The position of the color filter and the reflective material can be set in a suitable position according to actual design requirements; the present disclosure is not limited thereto.

Figure 10B:
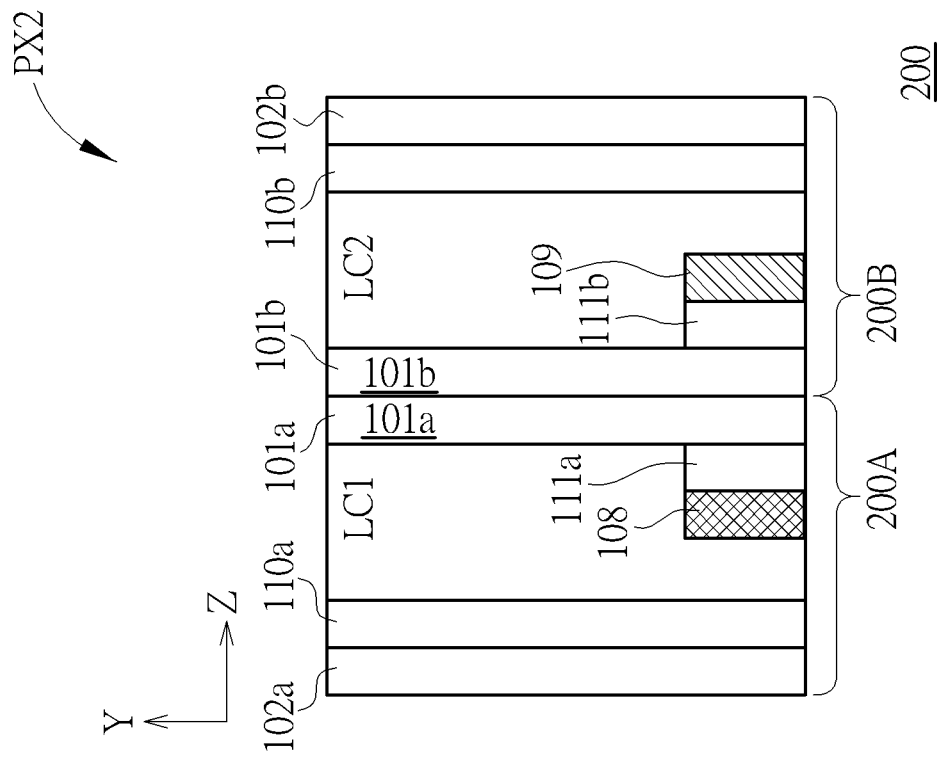
FIGS. 10A-10B illustrate additional variations of embodiment of FIG. 6A-6C.
Figure 10A:
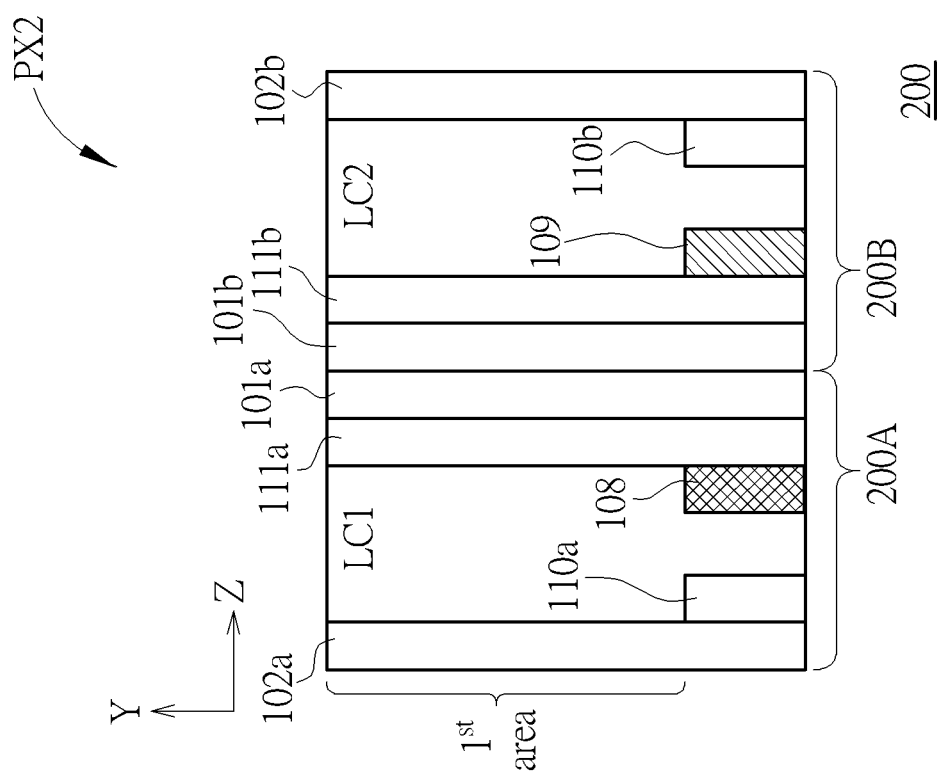

FIGS. 10A-10B illustrate another variation of the embodiment of the FIG. 6B. Please refer to the FIG. 10A, the transparent display device 200 of the present embodiment is similar to that shown in FIG. 6B, except for the following differences. In the present embodiment, the electrode 111a and/or the electrode 111b may extend from the display region R4 into the transparent area R3 according to design considerations, but not limited to this.

Please refer to the FIG. 10B, the transparent display device 200 of the present embodiment is similar to that shown in FIG. 6B, except for the following differences. In the present embodiment, the electrode 110a and/or the electrode 110b may extend from the display region R4 into the transparent area R3 according to design considerations, but not limited to this.

Please refer to the FIG. 11 illustrates front side view of a stack of two display panels of the FIG. 7B. In the left side of FIG. 11, from a front side view of the first transparent display panel 200A which can include a plurality of first conductive lines such as gate lines GL1 and data lines DL1 formed as shown. The center image shows a rear side view of the second transparent display panel 200B which can include a plurality of second conductive lines such as gate lines GL2 and data lines DL2 formed as shown. In the right side of FIG. 11, the first transparent display panel 200A and the second transparent display panel 200B are laminated together. In detail, FIG. 11 shows that the transparent display panel 200 includes a plurality sub pixel unit SB. The display regions R4 (include the electrode 110a, electrode 111a color filter 115a_1~115a_3, and the reflective material 108) in the first transparent display panel 200A are not parallel to the display regions R4 in the second transparent display panel 200B when the panels are laminated together. In addition, at least one of the first conductive lines, such as data lines DL1 or gate lines GL1, in the first transparent display panel 200A is not parallel to the at least one of the second conductive lines in the second transparent display panel 200B when the panels are laminated together. In some embodiment, any acute angle formed by at least one of the plurality of the first conductive lines of the first transparent display panel 200A and at least one of the plurality of the second conductive lines of the second transparent display panel 200B could be greater than 4 degrees. Furthermore, in another embodiment, the space or gap between two adjacent reflective materials could be less than 10 um. Therefore, better display quality can be achieved. FIG. 11 is only an example to aid in the understanding of the disclosure and the application is not limited to this.

FIG. 12 illustrates a schematic diagram of the reflective material and/or conductive lines. As shown in FIG. 12, a plurality of gate lines GL can be disposed in parallel with each other but at an angle to the display. Reflective material 308 can be disposed on at least a portion of the gate lines GL to prevent viewing of them. In other words, at least a portion of the first conductive lines are overlapped by at least a portion of the reflective material 308. In FIG. 12, portions of the gate lines GL that are located behind the reflective material 308 are illustrated as dashed lines.

In some embodiments, the reflective materials 308 are arranged in a direction, which can be regarded as the extension direction of the diagonal of an imaginary rectangle, the first side of the imaginary rectangle extends in the x direction, and the second side extends in the y direction. In some embodiments, the slope of the reflective material 308 is less than pixel pitch y1/pixel pitch x1 or less than pixel pitch y1/sub pixel pitch x2 (wherein sub pixel pitch x2 is less than pixel pitch y1). The pixel pitch x1 in this embodiment can be defined as the minimum pitch of the same side of the data lines DL of two adjacent sub pixels of the same color in the above X direction. The sub pixel pitch x2 in this embodiment can be defined as the minimum distance between the same side edges of two adjacent data lines DL in the above X direction. The pixel pitch y1 in this embodiment can be defined as along the y direction, the distance between the same side edges of two adjacent gate lines GL. Therefore, better display quality can be achieved.

The embodiments and variations thereof described above solve the prior art problems of reversed or difficult to read characters when viewed from the rear of a transparent display as well as reducing or eliminating moiré when the teaching are employed in a double panel transparent display.

Those skilled in the art will readily observe that numerous modifications and alterations of the device and method may be made while retaining the teachings of the disclosure. Accordingly, the above disclosure should be construed as limited only by the metes and bounds of the appended claims.

What is claimed is:

1. A transparent display device comprising a plurality of pixel units, wherein one of the plurality of pixel units has a transparent region and a display region, and the pixel unit comprising:
   a first substrate;
   a second substrate;
   a display medium disposed between the first substrate and the second substrate;
   a first reflective material disposed in the display region and disposed between the first substrate and the display medium;
   a second reflective material disposed in the display region and disposed between the second substrate and the display medium; and
   a first electrode and a second electrode disposed between the first substrate and the display medium;
   wherein:
      the display region comprises a first region and a second region, and in a front side view, the first region is disposed between the transparent region and the second region;
      the first reflective material is disposed in the first region, and the second reflective material is disposed in the second region; and
      the first electrode is disposed in the first region, and the second electrode is disposed in the second region.

2. The transparent display device of claim 1, wherein the first reflective material and the second reflective material comprise at least one of Ag, Ag alloy, Al, and/or Al alloy.

3. The transparent display device of claim 1, further comprising a third electrode, disposed between the first substrate and the display medium, wherein the third electrode is disposed in the transparent region.

4. The transparent display device of claim 1, wherein the first electrode and the second electrode are controlled separately.

5. The transparent display device of claim 1, wherein the first electrode is further disposed in the transparent region.

6. The transparent display device of claim 1, further comprising a color filter disposed between the second substrate and the display medium, wherein the color filter is disposed in the display region.

* * * * *